(12) United States Patent
Blouin et al.

(10) Patent No.: US 11,155,135 B2
(45) Date of Patent: Oct. 26, 2021

(54) TRACTION SYSTEM FOR RAILCAR MOVERS

(71) Applicant: NORDCO INC., Oak Creek, WI (US)

(72) Inventors: Michael Terrence Blouin, Merriam, KS (US); Andrew Marcus Noyes, Overland Park, KS (US); Lee William Campbell, Holt, MO (US); Joel Wesley Frank, Kearney, MO (US); Eric John Slocombe, Overland Park, KS (US)

(73) Assignee: NORDCO INC., Oak Creek, WI (US)

( * ) Notice: Subject to any disclaimer, the term of this patent is extended or adjusted under 35 U.S.C. 154(b) by 369 days.

(21) Appl. No.: 16/395,394

(22) Filed: Apr. 26, 2019

(65) Prior Publication Data

US 2019/0375257 A1    Dec. 12, 2019

Related U.S. Application Data

(60) Provisional application No. 62/681,248, filed on Jun. 6, 2018.

(51) Int. Cl.
  *B60F 1/04*  (2006.01)
  *B60F 1/00*  (2006.01)
  *B61J 3/12*  (2006.01)
(52) U.S. Cl.
  CPC ............... *B60F 1/005* (2013.01); *B61J 3/12* (2013.01)
(58) Field of Classification Search
  CPC . B61J 3/12; B61C 15/00; B61C 15/02; B61C 15/04; B61C 15/08; B61C 15/12;
  (Continued)

(56) References Cited

U.S. PATENT DOCUMENTS

| 4,896,090 A | 1/1990 | Balch et al. |
| 4,976,332 A | 12/1990 | Hein |

(Continued)

FOREIGN PATENT DOCUMENTS

| DE | 40 41 970 | * | 7/1992 |
| JP | H09-025604 A | | 1/1997 |

OTHER PUBLICATIONS

"Railway Maintenance Vehicle", printout of Nordco webpage from Jul. 3, 2013 via Wayback Machine, <www.nordco.com>.

*Primary Examiner* — Mark T Le
(74) *Attorney, Agent, or Firm* — Greer, Burns & Crain, Ltd.

(57) ABSTRACT

A traction system is provided for a rail draft vehicle including an engine with a driveshaft, at least a pair of rubber-tired traction wheels, and at least one rail guide wheel pressurized relative to the vehicle by at least one fluid-powered cylinder. Included in the system are a programmable processor connected to a driveshaft speed sensor, a rail guide wheel speed sensor, an engine throttle controller, a fluid-powered cylinder controller and a vehicle control panel. The processor is constructed and arranged for automatically adjusting the engine throttle controller in coordination with the fluid-powered cylinder controller for achieving movement of the rail draft vehicle from a dead stop position by increasing applied vehicle weight upon the traction wheels by the at least one fluid-powered cylinder and adjusting engine RPM's until the vehicle begins movement as detected by the rail guide wheel speed sensor.

12 Claims, 3 Drawing Sheets

(58) Field of Classification Search
CPC .. B61C 15/14; B60F 1/005; B60F 1/04; B60F 1/02; B60F 1/043; B60F 2301/04
See application file for complete search history.

(56) References Cited

U.S. PATENT DOCUMENTS

| | | | |
|---|---|---|---|
| 5,103,740 A * | 4/1992 | Masse | B60F 1/043 |
| | | | 105/72.2 |
| 5,515,788 A | 5/1996 | Theurer et al. | |
| 5,619,929 A | 4/1997 | Theurer | |
| 5,640,909 A | 6/1997 | Theurer | |
| 5,752,447 A | 5/1998 | Theurer | |
| 5,927,426 A | 7/1999 | Hall et al. | |
| 6,012,011 A | 1/2000 | Johnson | |
| 6,705,232 B2 | 3/2004 | Theurer et al. | |
| 6,805,059 B2 | 10/2004 | Theurer et al. | |
| 6,865,991 B2 | 3/2005 | Theurer | |
| 7,064,507 B2 | 6/2006 | Donnelly et al. | |
| 7,383,777 B2 | 6/2008 | Theurer et al. | |
| 8,863,670 B2 | 10/2014 | Jackson | |
| 10,300,752 B2 * | 5/2019 | Dumalski | B60F 1/005 |
| 2004/0003750 A1 | 1/2004 | Theurer et al. | |
| 2004/0069180 A1 | 4/2004 | Theurer | |
| 2007/0283836 A1 | 12/2007 | Theurer et al. | |
| 2008/0028972 A1 | 2/2008 | Fedorchuk | |
| 2011/0030573 A1 | 2/2011 | Theurer et al. | |
| 2013/0087067 A1 * | 4/2013 | Bodell | E02F 9/022 |
| | | | 105/215.2 |
| 2015/0057850 A1 | 2/2015 | Dickerson et al. | |

* cited by examiner

TRACTION SYSTEM FOR RAILCAR MOVERS

RELATED APPLICATION

This application claims 35 USC 119 priority from U.S. Ser. No. 62/681,248 filed Jun. 6, 2018, the contents of which are incorporated by reference.

BACKGROUND

The present invention generally relates to railway draft vehicles used to move railcars along railroad track, also referred to as rail movers or rail car movers. More specifically, the present invention relates to an improved traction control system for such a draft vehicle that has rubber-tired traction wheels.

Rail draft vehicles are typically found in rail yards or industrial sites for moving single or groups of rail cars to form trains. These vehicles feature rubber-tired traction wheels for contacting the rails, since it has been found that such wheels have a higher coefficient of friction with the rails than steel wheels and are thus able to develop increased pulling power compared to steel wheeled vehicles. In addition to the rubber tires, the draft vehicles also have at least one pair of conventional steel rail guide wheels.

A regular challenge for operators of rail draft vehicles of this type is the initiation of movement of a pulled load from a dead stop. The pulled load ranges from a single boxcar to an extended train of many such cars. Operators need to be skilled at moving the pulled load under a variety of conditions, including when the rails are wet, icy and/or covered with leaves or other debris. Any of these conditions interfere with traction of the rubber-tired traction wheels.

To begin moving a load under any conditions, the operator adjusts the vehicle's engine throttle as well as the load on the traction wheels, which is indirectly controlled by at least one fluid-powered cylinder that controls the height of steel rail guide wheels. By maintaining the rail guide wheels at a desired distance from the draft vehicle, the cylinders exert a jacking pressure on the vehicle, which also influences the amount of vehicle weight exerted on the rubber-tired traction wheels. While the precise values vary by vehicle model, in one example, under normal operating conditions, the cylinders exert 1100 psi on the rail guide wheels. During startup or the beginning of load movement from a dead stop, conventional draft vehicles have a pressure adjust button that automatically reduces the pressure on the cylinders to 800 psi, which increases the vehicle weight applied to the rubber-tired traction wheels.

Such increase of the vehicle weight applied to the rubber-tired traction wheels significantly increases traction and facilitates start from a dead stop. However, a drawback of this type of system is that the operator often forgets to change the pressure exerted by the cylinders back to the normal operating mode, and the vehicle operates with excess vehicle weight applied to the traction wheels, which increases tire wear. The increased tire wear is sometimes further increased as the operator increases throttle RPM's at the start beyond what is necessary for startup. This causes wheel spinning on the rails, which also is detrimental to tire life.

Another factor in reducing tire wear in these vehicles is that starting techniques vary from operator to operator, with some operators inducing more wheel spinning and/or prolonged enhanced vehicle loading than others.

Thus, there is a need for an operational system for rail draft vehicles of this type which addresses the problems identified above.

SUMMARY

The above-listed need is met or exceeded by the present rail draft vehicle traction system, which is designed to simplify the procedure required to move loaded rail cars. The present system improves the application of available tractive effort while reducing tire wear. Loads are more consistently moved from a dead stop condition on an automatic basis that adjusts for different track conditions. As a result, the load moving process is made simpler and with reduced operator-induced variability.

A feature of the present traction system is that vehicle loading is automatically balanced with vehicle throttle RPM's so that enhanced tractive effort is applied to begin load movement without causing tire slippage or prolonged operation at enhanced vehicle weight loading. The present traction system is connected to the vehicle throttle, to the vehicle driveshaft and to the rail guide wheel suspension cylinders, and also receives motion data from sensors monitoring the movement of the rail guide wheels and engine drive shaft. A feedback loop is created upon the operator pressing an ENGAGE button. The vehicle throttle is automatically increased by a preset RPM, in one embodiment 10 RPMs per second, which may vary depending on the application. If driveshaft speed increases, but rail guide wheels are not rotating, the system notes that the rubber-tired traction wheels are slipping on the rail. If the rail guide wheels are rotating, the load is moving and no further action is taken, and the system soon reverts to operator control.

However, if the rail guide wheels are not rotating, indicating that the traction wheels are slipping, the system automatically decreases throttle RPM's by a preset amount which varies by the application. If the rail guide wheels are still not rotating, the rail pressure exerted by the cylinders is decreased, increasing vehicle weight on the traction wheels by a preset amount of psi as described above. If, after the increase in vehicle weight and the reduction in RPM's, the rail guide wheels are still not rotating (no load movement), the system checks to see if a maximum system vehicle weight pressure has been applied. If so, the system generates an indicator to the operator that the load is too heavy and should be reduced, as by removing cars from the train.

Alternately, if the maximum weight pressure has not been applied, upon increase of the vehicle weight, the system automatically incrementally increases vehicle RPM's by a preset amount until the system senses that the rail guide wheels are rotating. If the driveshaft begins rotating and the guide wheels are not rotating, the system repeats the cycle by further reducing the throttle RPM's and increasing applied vehicle weight. It has been found that the preferred tractive condition is just before the traction wheels begin spinning on the rails. It is contemplated, that during this process, the system has the capability to reduce the pressure in the fluid power cylinders (increasing applied vehicle weight on the traction wheels) below the standard reduction for that model of vehicle.

Upon sensing rotation of the rail guide wheels (vehicle and train movement from a stop position), the present system holds the RPM command, and if necessary, automatically and gradually reduces applied vehicle weight to the traction wheels by increasing pressure in the fluid power cylinders to a preset operational level, for one model of vehicle, preferably 1100 psi or the like, whatever is normal operation for that particular vehicle. At that time, the system notifies the operator that the vehicle operation can resume under manual control.

Once the vehicle and train are moving, the system determines whether the pressure on the fluid power cylinders is below the desired operating pressure, which is between the low operating pressure and the standard operating pressure. As pressure increases (applied vehicle weight on the traction wheels is reduced), there is a possibility that the traction wheels may begin to spin. If so, the operator is provided with an indicator from the system that the train weight is excessive for that pressure. If not, the system provides the indication to the operator that manual operation can resume.

For safety reasons, there are three instances that will disengage the present traction system: 1), if the operator exceeds the commanded engine RPM's with the vehicle throttle controls; 2) if the operator applies vehicle or train brakes; or 3) if the operator does not press the Vigilance/Dead Man switch before the vehicle timer reaches 0.

More specifically, a traction system is provided for a rail draft vehicle including an engine with a driveshaft, at least a pair of rubber-tired traction wheels, and at least one rail guide wheel pressurized relative to the vehicle by at least one fluid-powered cylinder. Included in the system are a programmable processor connected to a driveshaft speed sensor, a rail guide wheel speed sensor, an engine throttle controller, a fluid-powered cylinder controller and a vehicle control panel. The processor is constructed and arranged for automatically adjusting the engine throttle controller in coordination with the fluid-powered cylinder controller for achieving movement of the rail draft vehicle from a dead stop position by increasing applied vehicle weight upon the traction wheels by the at least one fluid-powered cylinder and adjusting engine RPM's until the vehicle begins movement as detected by the rail guide wheel speed sensor.

In another embodiment, a rail draft vehicle is provided, including an engine with a throttle controller, a driveshaft and a driveshaft sensor, at least a pair of rubber-tired traction wheels powered by the engine, at least one rail guide wheel constructed and engaged for engaging rails traversed by the vehicle, the at least one rail guide wheel having at least one speed sensor and being pressurized relative to the vehicle by at least one fluid-powered cylinder. Also included is a fluid-powered cylinder controller, a control panel in operational relationship to the engine, a programmable processor connected to the driveshaft speed sensor, the rail guide wheel speed sensor, the engine throttle controller, the fluid-powered cylinder controller and the vehicle control panel. The processor is constructed and arranged for automatically adjusting the engine throttle controller in coordination with the fluid-powered cylinder controller for achieving movement of the rail draft vehicle from a dead stop position by increasing applied vehicle weight upon the traction wheels by the at least one fluid-powered cylinder and adjusting engine RPM's until the vehicle begins movement as detected by the rail guide wheel speed sensor.

DETAILED DESCRIPTION

Figure 1:
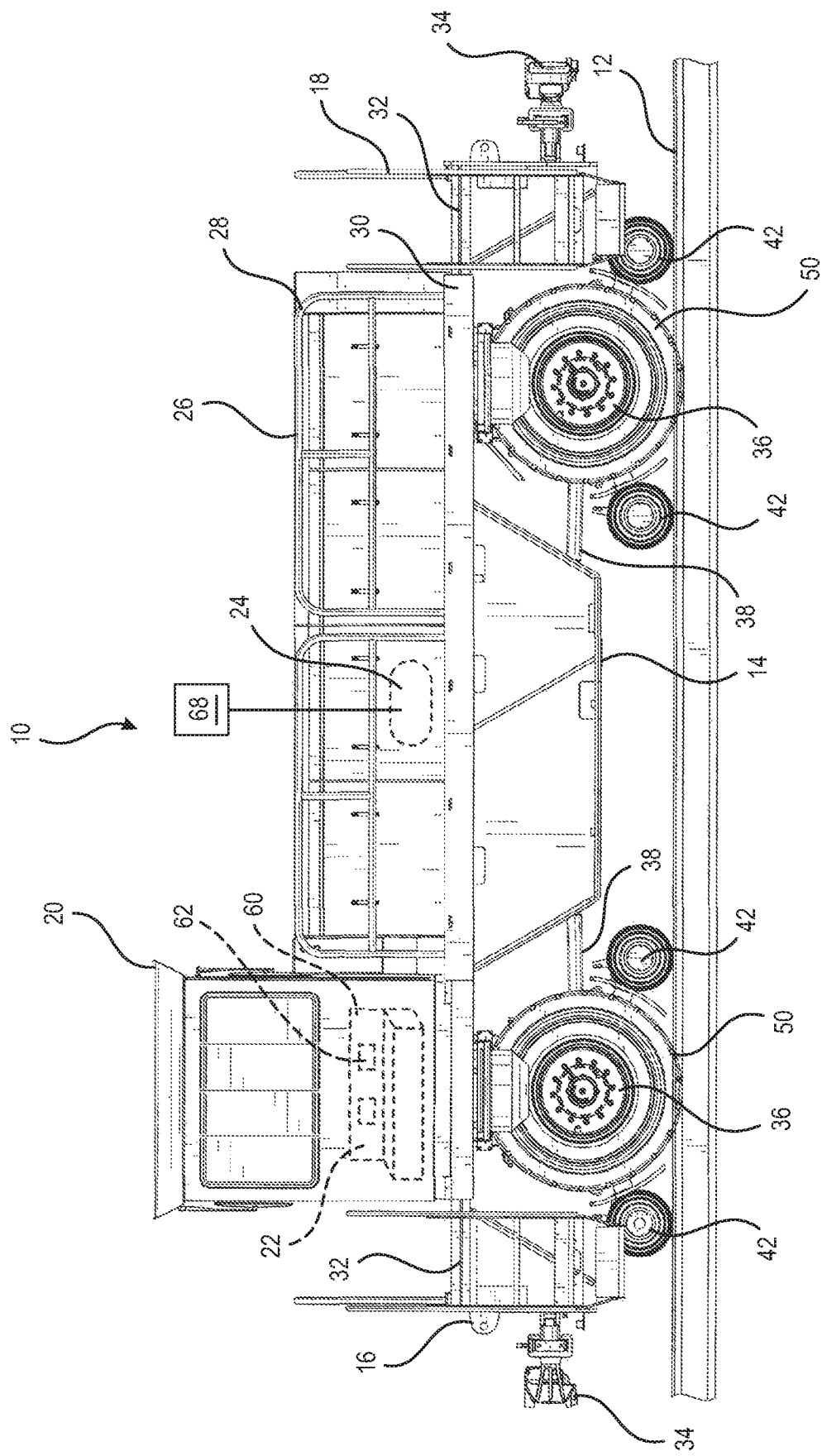
FIG. 1 is a side elevation of a rail draft vehicle suitable for use with the present traction system.
Figure 2:
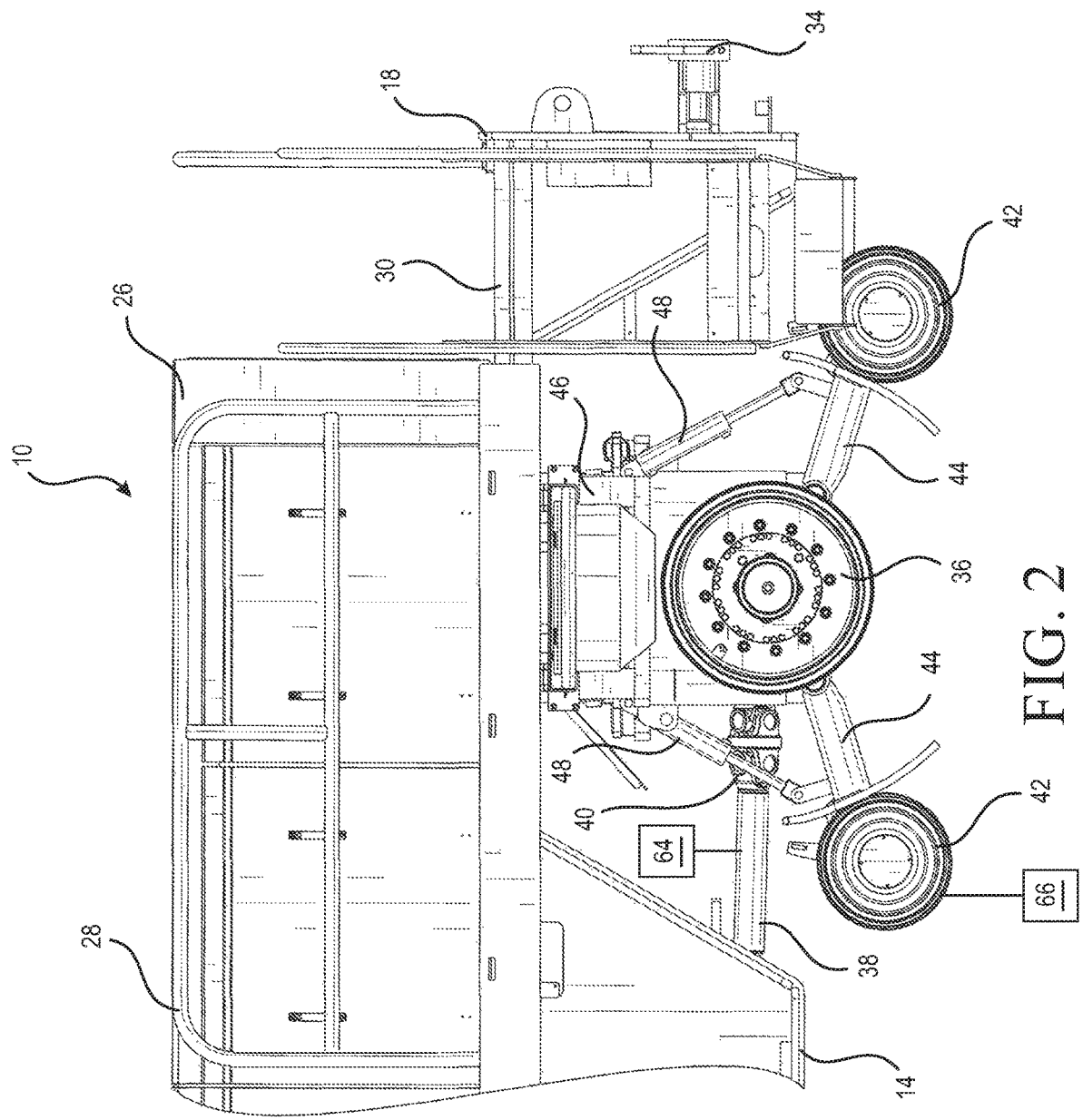
FIG. 2 is an enlarged fragmentary side elevation of the rail draft vehicle of FIG. 1.

Referring now to FIGS. 1 and 2, a railway draft vehicle constructed in accordance with the present invention is generally designated 10 and is used in railcar sidings and the like to move railcars along conventional railroad track rails 12. The vehicle 10 has a frame 14 with a front end 16 and a rear end 18. A cab 20 is included on the vehicle 10 for accommodating an operator (not shown). A control panel 22, shown schematically and hidden, is provided for operating the vehicle 10, and is preferably located inside the cab 20, however other locations are contemplated. For the purposes of this application "control panel" is intended to broadly refer to any format of operator interface with controls, warning lights, audible alarms and the like related to the operation of the vehicle 10, including, mechanical, digital, wireless or other sorts of controls used to operate the vehicle 10.

A conventional internal combustion engine 24 (shown hidden), preferably a diesel engine, is associated with the frame 14 and is covered by a cowl or housing 26. Vehicles 10 tend to have relatively high powered engines needed for pulling longer trains in the rail yard. It is not uncommon for the vehicle 10 to have the engine 24 with a displacement in the range of 6.7 to 9 liters or higher. Guard rails 28 are provided on an access platform 30 generally extending around a periphery of the housing 26. Front and rear ladders 32 are located near the front end 16 and the opposite rear end 18 for the operator to more easily access the cab 20. Couplers 34 are provided at front and rear ends 16 and 18, respectively, of the vehicle frame 14 for selective coupling with railcars as is well known in the art.

Referring now to FIGS. 1 and 2, the present system is directed to the type of rail draft or rail mover vehicle 10 employing at least one and preferably two pair of rubber-tired traction wheels 36 which engage the rails 12 for pulling individual or multiple rail cars used in the formation of trains. As is well known in the art, the traction wheels 36 are powered by the engine 24 through at least one driveshaft 38, typically employing multiple U-joints 40. In addition to the traction wheels 36, the vehicle 10 is provided with at least one and preferably two steel, radially-flanged rail guide wheels 42 for each traction wheel.

Each rail guide wheel 42 is pivotally joined, by a bracket or link arm 44 to a corresponding axle mount 46 shared with the corresponding traction wheel 36. The respective pivot position of each rail guide wheel 42 is controlled by a fluid-powered, preferably hydraulic cylinder 48 connected between the bracket 44 and the axle mount 46. Selective pressurization of the cylinders 48 will raise or lower the rail guide wheels 42 relative to the frame 14. Also, once the vehicle 10 is operationally positioned on the rails 12, the selective pressurization of the cylinders 48 is used to distribute the weight of the vehicle between the traction wheels 36 and the rail guide wheels 42. It is well known in the art to equally pressurize all of the cylinders 48 using a conventional fluid power system (not shown) so that there is an even distribution of weight between the various traction wheels 36.

In addition, it is well known in the art that if more traction is desired for the traction wheels 36, the pressure in the cylinders 48 is reduced a specified amount, so that the vehicle weight borne by the traction wheels is increased, which also increases traction, as is sometimes needed in wet, snowy, icy or debris-filled track conditions. Many vehicles 10 are equipped in the cab 20 with a special "traction enhancer" control such as a button or the like connected to the vehicle hydraulic system which upon activation, reduces the pressure in the cylinders 48 from a standard pressure to a low pressure setting or value. The pressure values may vary to suit the application.

As stated above, a common operational problem of such vehicles 10 is that when additional traction is needed, such as when the rails 12 are slippery and/or dirty, the operator engages the "traction enhancer" for a temporary shift in weight distribution and the resulting enhanced traction on the traction wheels 36. The application of this enhancer is momentary. However, once the vehicle 10 and any pulled load is in motion along the rails 12, the operator often repeatedly engages the enhancer, and tires 50 on the traction wheels 36 become subject to increased wear, which shortens their operational life.

Figure 3:
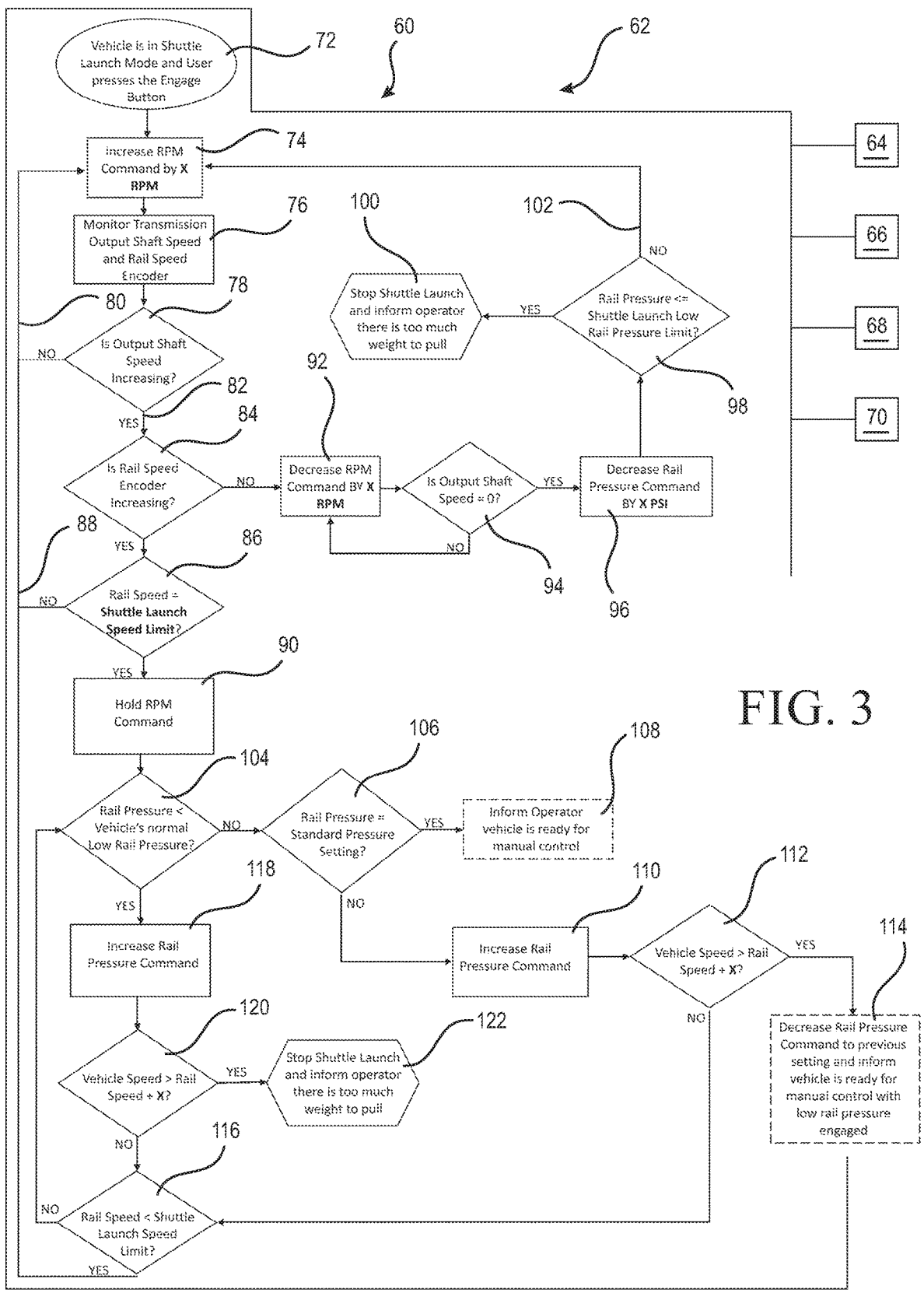
FIG. 3 is a schematic operational flow chart of the present traction control system.

Referring now to FIGS. 1 and 3, this problem is addressed and solved by the present traction control system, generally designated 60, which incorporates programmed computer processor control over the process of initiating movement of the vehicle 10 and its load of at least one rail car, upon the rails 12. While the system, mainly embodied in a processor 62 is located in the cab 20 and associated with the control panel 22, the processor may be located in other places. For purposes of explanation, in the present application, "processor" includes a device bearing executable, non-transitory instructions stored thereon, or is encoded with executable hardware/(non-transitory) software/firmware instructions. In addition, it is contemplated that the processor 62 is provided with suitable memory, either integral with or separate from the processor as is well known in the art. Typical examples of the processor 62 are a central processing unit (CPU), a computer, a microprocessor, or an application-specific integrated circuit (ASIC).

In addition to the processor 62, the system 60 includes a driveshaft sensor 64 such as an encoder measuring rotation or speed of the driveshaft 38, a rail guide wheel speed sensor 66 (FIG. 2) such as an encoder in operational proximity to one of the rail guide wheels 42 for measuring rotation of the wheels, an engine throttle controller 68 controlling the speed of the engine 24, and a fluid-powered cylinder controller 70 preferably associated with a hydraulic tank (FIG. 1) enabling control over the pressurization of all of the fluid power cylinders 48. The precise type and location of sensors and controllers mentioned above may vary to suit the situation, but are all known in the art and are connected to the processor 62 (FIG. 3). The present system 60 also includes functions of the control panel 22.

The processor 62 is constructed/programmed and arranged for automatically sending appropriate signals for adjusting the engine throttle controller 68 in coordination with the fluid-powered cylinder controller 70 for achieving movement of the rail draft vehicle 10 from a dead stop position by increasing applied vehicle weight upon the traction wheels 36 by the fluid-powered cylinders 48 and adjusting engine RPM's until the vehicle begins movement as detected by the rail guide wheel speed sensor 66.

Referring now to FIG. 3, in the processor 62, the following operations are programmed. Once the vehicle 10 is connected to a load, which is contemplated as being from one to several rail cars, establishing traction on the rails 12 becomes very important. In general, the processor 62 is programmed to gradually increase engine RPM's through the transmission of appropriate signals for control of the throttle controller 68 and increase vehicle weight applied to the traction wheels 36 through associated signals used for the control of (mainly depressurizing) the fluid-powered cylinders 48 through the fluid-powered cylinder controller 70 until the vehicle begins movement. The flow chart of FIG. 3 is contemplated as being representative of a machine control system which uses the processor 62 to monitor and actuate machine components or functions in a manner that is known to practitioners in this art.

The operator initiates the system 60 by actuating an ENGAGE button 72 on the control panel 22. Actuating the ENGAGE button initiates operation of the processor 62, which as described below in greater detail monitors the driveshaft speed sensor 64, the rail guide wheel speed sensor 66, and performs coordination of the fluid-powered cylinder controller 70 and the engine throttle controller 68 on an automatic basis until the vehicle 10 begins movement, after which the system 60 reverts to manual control of the vehicle.

At step 74, the processor 62 signals the throttle controller 68 to increase RPM's in the engine 24 to a preset amount, contemplated as being about 10 RPM's per second, which may vary to suit the application and the size of the engine of the vehicle 10. 20 RPM's per second is also contemplated. At this point, seen at step 76, the processor 62 monitors the sensed speeds of the driveshaft 38 and the rail guide wheels 42 using the respective sensors 64, 66. If the speeds of both sensors are acceptable, the vehicle 10 has sufficient traction or the engine RPM's are not sufficient to move the vehicle and train. More specifically, at step 78, the processor 62 monitors the speed of the drive shaft 38. If the speed is not increasing, at 80, the loop repeats and speed is incrementally increased. If the driveshaft speed is increasing, at 82, the processor 62 monitors whether the rail guide wheel speed is increasing at 84. If it is, then the vehicle 10 has traction, and will move forward along the rails 12.

Assuming the vehicle 10 is in motion, the processor at step 86 evaluates whether the vehicle speed has reached a preset operational limit. If not at step 88, the loop repeats to increase the speed. If the speed is appropriate, then at step 90 the processor holds the engine RPM constant.

Back to step 84, if the rail encoder speed is not increasing, the vehicle 10 is having traction problems due to poor track conditions or an overly heavy load. For this condition, the processor 62 is configured for incrementally decreasing RPM through the throttle controller 68 and optionally incrementally increasing applied vehicle weight to the traction wheels 36 until the rail guide wheel speed sensor 66 shows movement.

At step 92, the processor 62 signals the throttle controller 68 to reduce engine RPM's a preset amount to prevent spinning the traction wheels 36 on the rails 12. At step 94, the processor 62 determines whether the driveshaft speed measured by the sensor 64 is 0 RPM's. If not, then the traction wheels 36 are still spinning on the rails and the speed needs to be reduced. Once the driveshaft speed is 0, at step 96, the pressure in the cylinders 48 is reduced by a preset amount, increasing the vehicle weight on the traction wheels 36. The amount of pressure reduction may vary to suit the application. At step 98, the processor 62 determines whether the reduced pressure is less than or equal to a preset limit for the machine. If so, at step 100, an indicator is energized on the control panel 22 that the load for the vehicle 10 is too large and needs to be reduced, as by removing cars from the train. For the purposes of this application, an indicator will be understood to mean a visual and/or audible alarm, recorded verbal command, pattern of sounds, etc. all of which are well known in the art.

Alternately, if the reduced pressure is not less than or equal to the preset limit, at step 102 the system 60 loops back to increase RPM incrementally to see if the vehicle 10 will begin moving. This loop will repeat until the vehicle 10 achieves sufficient traction to begin movement.

Returning now to step 90, the vehicle 10 is now moving along the rails 12, and the next objective of the system 60 is to reduce the vehicle weight on the traction wheels 36 to prolong tire life. At step 104, the processor 62 checks the pressure on the hydraulic cylinders 48 and compares it to the normal low rail pressure, since a feature of the system 60 is that, to create load-moving traction, the fluid-powered cylinder pressure may be decreased below a standard low pressure value for that model of vehicle. If not at step 106, the pressure is compared to the standard setting. If the rail pressures are acceptable, then at step 108, the control panel 22 is energized to provide an indicator to the operator that the system 60 can be disabled and the vehicle 10 can be operated under manual control.

At step 110, if the sensed hydraulic cylinder pressure is not the standard pressure, then the processor 62 signals the fluid-power cylinder controller 70 to increase the pressure in the cylinders 48 (and thus accordingly lighten the vehicle weight applied to the traction wheels 36) until at step 112, the processor 62 evaluates whether the vehicle speed is greater than the rail speed by at least 0.2 mph, which may vary to suit the application. The system 60 is designed to balance vehicle speed and rail pressure, because if rail pressure is too high, the traction wheels 36 may begin to slip on the rails 12, even after the load is moving. If so, then at step 114 the processor 62 decreases the pressure to the previous setting and alerts the operator through an indicator at the control panel 22 that the vehicle 10 is ready for manual control, but will need low pressure to continue pulling the load.

Alternately, if the vehicle speed is not greater than the rail speed, at step 116, the processor 62 evaluates whether the rail speed of the vehicle 10 is less than the target speed for initiating the system 60. If not, the vehicle 10 is moving along the rails satisfactorily and the system loops to step 104 to try to increase rail pressure to the standard setting. If YES, the speed of the vehicle 10 is too slow due to extra weight or poor traction, and the system 60 then loops to step 74 to increase RPM's.

Similarly, at step 104, if the sensed hydraulic cylinder pressure is less than the acceptable rail pressure, which was lowered beyond normal low pressure values to obtain traction as discussed above, at step 118 the rail pressure is increased a preset amount, which will vary by the application. Then, at step 120, the processor 62 evaluates whether the vehicle speed has been increased based on the increased rail pressure, to avoid slippage of the traction wheels 36 on the rails 12 after the load is moving. If YES, then the traction wheels 36 are slipping even though the rail pressure has been placed at a desired value, and at step 122 the control panel 22 alerts the operator through an indicator that there is too much weight to pull. If NO, at step 110 the processor 62 makes the above-described evaluation of speeds per step 116.

While a particular embodiment of the present traction system for railcar movers has been described herein, it will be appreciated by those skilled in the art that changes and modifications may be made thereto without departing from the invention in its broader aspects and as set forth in the following claims.

The invention claimed is:

1. A traction system for a rail draft vehicle including an engine with a driveshaft, at least a pair of rubber-tired traction wheels, at least one rail guide wheel pressurized relative to the vehicle by at least one fluid-powered cylinder, the system comprising:

a processor connected to a driveshaft speed sensor, a rail guide wheel speed sensor, an engine throttle controller, a fluid-powered cylinder controller and a vehicle control panel;

said processor being constructed and arranged for automatically adjusting said engine throttle controller in coordination with said fluid-powered cylinder controller for achieving movement of said rail draft vehicle from a dead stop position by increasing applied vehicle weight upon the traction wheels by said at least one fluid-powered cylinder and adjusting engine RPM's until the vehicle begins movement as detected by said rail guide wheel speed sensor.

2. The system of claim 1, wherein said processor is programmed to gradually decrease engine RPM's through control of said throttle controller and increase vehicle weight applied to the traction wheels through control of said fluid powered cylinder controller until the vehicle begins movement.

3. The system of claim 1, further including an ENGAGE button on said vehicle control panel which initiates operation of said processor, which in turn monitors said driveshaft speed sensor, said rail wheel speed sensor, and performs said coordination of said fluid-powered cylinder controller and said engine throttle controller on an automatic basis until the vehicle begins movement, after which the system reverts to manual control of the vehicle.

4. The system of claim 3, wherein upon actuation of said ENGAGE button, said processor is programmed to automatically increase engine speed to a preset RPM through said throttle controller, and to determine whether driveshaft speed increases, through monitoring of said driveshaft sensor, greater than rotational speed of the rail guide wheels, through monitoring of said rail guide wheel sensor.

5. The system of claim 4, wherein upon sensing of rotation of the rail guide wheels, said system holds said RPM value and reduces applied vehicle weight to the traction wheels through operation of said fluid-power cylinder controller.

6. The system of claim 5, wherein upon said processor sensing that said sensed applied vehicle weight reaches a preset standard, an indicator is generated by said processor to the operator to resume manual control over said vehicle.

7. The system of claim 4, wherein upon sensing an increasing driveshaft speed and sensing a static, zero rail guide wheel speed, said processor is configured for decreasing engine RPM through said throttle controller, and increasing applied vehicle weight to the traction wheels through said fluid-powered cylinder controller.

8. The system of claim 7, wherein said processor compares the enhanced applied vehicle weight against a preset maximum applied vehicle weight, and if the enhanced weight is less than the preset maximum, the system is cleared for further RPM increase, and if the enhanced weight exceeds the preset maximum, an alert is generated for the operator on said control panel.

9. The system of claim 8, wherein as said throttle controller is activated by said processor for increased RPM, said processor also monitors said rail wheel speed sensor to determine if the vehicle has begun movement.

10. The system of claim 9, wherein said processor is configured for incrementally decreasing RPM through said throttle controller and optionally incrementally increasing applied vehicle weight to the traction wheels until said rail wheel speed sensor shows movement.

11. The system of claim 10, wherein once the vehicle is moving, said processor monitors whether the driveshaft speed at any time is faster than that of the rail guide wheels, taking into account a cushion factor, and if so, said processor generates an indicator that the train weight is excessive, and if not, said system provides an indication to the operator that manual operation can resume.

12. A rail draft vehicle, comprising:
- an engine with a throttle controller, a driveshaft and a driveshaft sensor;
- at least a pair of rubber-tired traction wheels powered by said engine;
- at least one rail guide wheel constructed and engaged for engaging rails traversed by said vehicle, said at least one rail guide wheel having at least one speed sensor and being pressurized relative to the vehicle by at least one fluid-powered cylinder;
- a fluid-powered cylinder controller;
- a control panel in operational relationship to said engine;
- a processor connected to said driveshaft speed sensor, said rail guide wheel speed sensor, said engine throttle controller, said fluid-powered cylinder controller and said vehicle control panel;
- said processor being constructed and arranged for automatically adjusting said engine throttle controller in coordination with said fluid-powered cylinder controller for achieving movement of said rail draft vehicle from a dead stop position by increasing applied vehicle weight upon the traction wheels by said at least one fluid-powered cylinder and adjusting engine RPM's until the vehicle begins movement as detected by said rail guide wheel speed sensor.

* * * * *